(12) United States Patent
Lee et al.

(10) Patent No.: US 12,442,555 B2
(45) Date of Patent: Oct. 14, 2025

(54) AIR CONDITIONING SYSTEM, AIR CONDITIONING CONTROL DEVICE, AND METHOD FOR CONTROLLING SAME

(71) Applicant: Samsung Electronics Co., Ltd., Suwon-si (KR)

(72) Inventors: Jehyeon Lee, Suwon-si (KR); Youngkyu Kim, Suwon-si (KR); Hyeokjin Kim, Suwon-si (KR); Kwanwoo Song, Suwon-si (KR); Sunggeun Song, Suwon-si (KR); Doyoung Joung, Suwon-si (KR); Abhishek Kumar, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 18/155,446

(22) Filed: Jan. 17, 2023

(65) Prior Publication Data

US 2023/0151993 A1    May 18, 2023

Related U.S. Application Data

(63) Continuation of application No. PCT/KR2021/008854, filed on Jul. 12, 2021.

(30) Foreign Application Priority Data

Sep. 8, 2020    (KR) .................. 10-2020-0114459

(51) Int. Cl.
*F24F 11/63* (2018.01)
*F24F 11/46* (2018.01)
*G05B 19/042* (2006.01)

(52) U.S. Cl.
CPC ............. *F24F 11/63* (2018.01); *F24F 11/46* (2018.01); *G05B 19/042* (2013.01); *G05B 2219/2614* (2013.01)

(58) Field of Classification Search
CPC ......... F24F 11/63; F24F 11/46; G05B 19/042; G05B 2219/2614
See application file for complete search history.

(56) References Cited

U.S. PATENT DOCUMENTS

| 8,991,200 B2 | 3/2015 | Hwang et al. |
| 2006/0191275 A1 | 8/2006 | Jung et al. |
| (Continued) | | |

FOREIGN PATENT DOCUMENTS

| EP | 2 704 290 B1 | 9/2022 |
| JP | 3104625 B2 | 10/2000 |
| (Continued) | | |

OTHER PUBLICATIONS

International Search Report with Written Opinion dated Oct. 21, 2021; International Patent Application No. PCT/KR2021/008854.

*Primary Examiner* — Michael W Choi
(74) *Attorney, Agent, or Firm* — Jefferson IP Law, LLP

(57) ABSTRACT

The disclosure relates to an air conditioning system comprising water heat source type heat source devices, and provides an air conditioning control device, an air conditioning system, and an air conditioning system control method which distributes consumed energy of heat source devices to each user. An air conditioning control device is provided. The air conditioning control device includes a first communication unit which communicates with a plurality of outdoor units and a plurality of indoor units connected to the plurality of outdoor units, a second communication unit which communicates with a plurality of heat source devices connected to the plurality of outdoor units, and a control unit configured to determine a reference energy and a consumption energy of the plurality of heat source devices, distribute, in a case in which the consumed energy of the plurality of heat source device exceeds the reference energy, an excess amount of energy to the plurality of indoor units, and set an (Continued)

energy consumption of each of the plurality of indoor units based on the distributed excess energy amount, wherein each of the plurality of heat source devices is a water heat source type of heat source device.

16 Claims, 11 Drawing Sheets

(56) References Cited

U.S. PATENT DOCUMENTS

| | | | |
|---|---|---|---|
| 2012/0017619 | A1 | 1/2012 | Yabuta et al. |
| 2012/0297806 | A1* | 11/2012 | Honda ............... F25B 41/34 62/222 |
| 2020/0393154 | A1* | 12/2020 | Marengo ........... F24D 19/1078 |

FOREIGN PATENT DOCUMENTS

| | | |
|---|---|---|
| JP | 3104626 B2 | 10/2000 |
| JP | 2008-151469 A | 7/2008 |
| JP | 4390929 B2 | 12/2009 |
| JP | 2016-056986 A | 4/2016 |
| JP | 6083222 B2 | 2/2017 |
| KR | 10-0688203 B1 | 3/2007 |
| KR | 10-0751834 B1 | 8/2007 |
| KR | 10-2013-0038559 A | 4/2013 |
| KR | 10-1270606 B1 | 6/2013 |
| KR | 10-2014-0029180 A | 3/2014 |
| KR | 10-2014-0115787 A | 10/2014 |
| KR | 10-1955812 B1 | 3/2019 |
| KR | 10-1965738 B1 | 8/2019 |
| KR | 10-2117597 B1 | 6/2020 |
| KR | 10-2399915 B1 | 5/2022 |

* cited by examiner

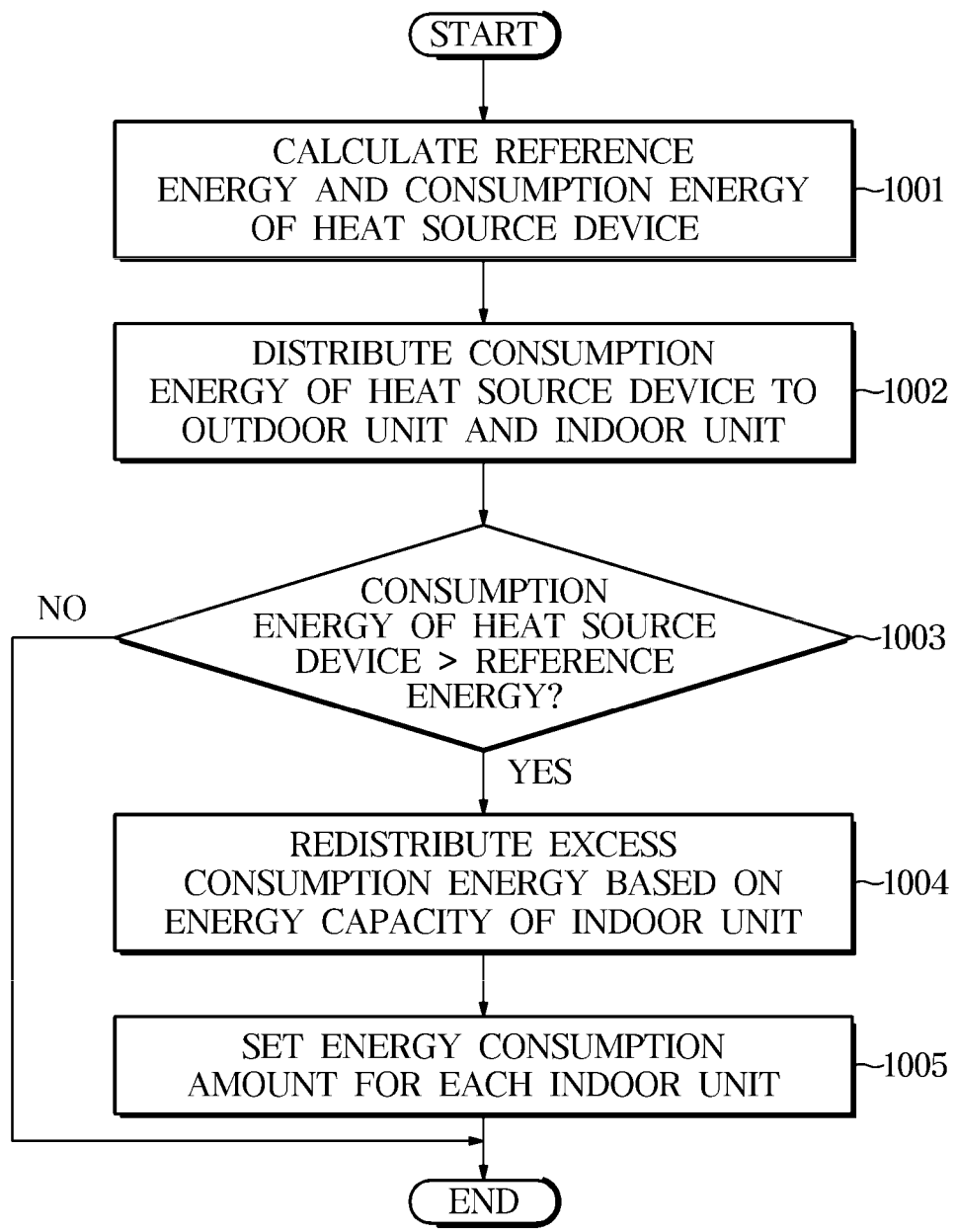

AIR CONDITIONING SYSTEM, AIR CONDITIONING CONTROL DEVICE, AND METHOD FOR CONTROLLING SAME

CROSS-REFERENCE TO RELATED APPLICATION(S)

This application is a continuation application, claiming priority under § 365(c), of an International application No. PCT/KR2021/008854, filed on Jul. 12, 2021, which is based on and claims the benefit of a Korean patent application number 10-2020-0114459, filed on Sep. 8, 2020, in the Korean Intellectual Property Office, the disclosure of which is incorporated by reference herein in its entirety.

BACKGROUND

1. Field

The disclosure relates to an air conditioning system. More particularly, the disclosure relates to an air conditioning system for calculating an energy amount of a water heat source included in the air conditioning system, an air conditioning control device, and a method for controlling the same.

2. Description of Related Art

A water heat source type air conditioning system is a system that causes heat exchange between a refrigerant flowing along a refrigerant pipe and water supplied to a water supply pipe, instead of a blow fan, installed in an outdoor heat exchanger of an air conditioner capable of performing both heating and cooling.

Meanwhile, in the system, users may use different indoor units. In this case, an energy consumption amount for an outdoor unit needs to be distributed to the respective users to calculate an energy consumption amount for each user.

Meanwhile, in the water heat source type air conditioning system, energy distributions for heat sources including a cooling tower, a pump, a boiler, and an expansion tank are also needed.

Meanwhile, there is an existing technique of distributing power consumption measured by a watt hour meter according to the operation states of indoor units and outdoor units and displaying the distributed power consumption on a power indicator for each indoor unit. However, an energy distribution for a water heat source type heat source device has not yet been studied. Accordingly, a study of a rational energy distribution for an air conditioning system using a water heat source type heat source device is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an air conditioning system including a water heat source type heat source device and rationally distributing consumption energy of the heat source device to respective users, an air conditioning control device, and a method for controlling the same.

Additional aspects will be set forth in part in the description which follows and, in part, will be apparent from the description, or may be learned by practice of the presented embodiments.

In accordance with an aspect of the disclosure, an air conditioning control device is provided. The air conditioning control device includes a first communicator configured to communicate with a plurality of outdoor units and a plurality of indoor units connected with the plurality of outdoor units, a second communicator configured to communicate with a plurality of heat source devices connected with the plurality of outdoor units, and a controller configured to determine a reference energy and a consumption energy of the plurality of heat source devices, distribute, in a case in which the consumption energy of the plurality of heat source devices exceeds the reference energy, an excess energy amount to the plurality of indoor units, and set an energy consumption amount of each of the plurality of indoor units based on the distributed excess energy amount, wherein each of the plurality of heat source devices is a water heat source type of heat source device.

The controller may set the reference energy based on a consumption energy of the plurality of outdoor units.

The controller may set the energy consumption amount of each of the indoor units by distributing excess consumption energy of the plurality of heat source devices based on energy capacities of the plurality of indoor units.

The controller may set the energy consumption amount of each of the plurality of indoor units by distributing the reference energy based on a consumption energy of each of the plurality of outdoor units.

The controller may set the energy consumption amount of each of the plurality of indoor units by distributing the reference energy based on the consumption energy of each of the plurality of indoor units respectively connected with the plurality of outdoor units.

The controller may calculate a consumption energy of the plurality of heat source devices based on the compression energy of the plurality of outdoor units and heat absorption amounts of the plurality of indoor units.

The air conditioning control device according to an embodiment may further include a display, wherein the controller may control a display provided in an energy amount calculator to display energy consumption amounts of the plurality of indoor units in correspondence to the plurality of indoor units.

In accordance with another aspect of the disclosure, a method performed by an air conditioning control device is provided. The method includes determining a reference energy and a consumption energy of a plurality of heat source device connected with a plurality of outdoor units s, distributing, in a case in which the consumption energy of the plurality of heat source devices exceeds the reference energy, an excess energy amount to a plurality of indoor units connected with the plurality of outdoor units, and setting an energy consumption amount of each of the plurality of indoor units based on the distributed excess energy amount, wherein each the plurality of heat source devices is a water heat source type of heat source device.

The setting of the reference energy may include setting the reference energy based on the consumption energy of the plurality of outdoor units.

The setting of the energy consumption amount of each of the plurality of indoor units may include setting the energy consumption amount of each of the plurality of indoor units by distributing excess consumption energy of the heat source devices based on an energy capacity of each of the plurality of indoor units.

The setting of the energy consumption amount of each of the plurality of indoor units may include setting the energy consumption amount of each of the plurality of indoor units by distributing the reference energy based on a consumption energy of each of the plurality of outdoor units.

The setting of the energy consumption amount of each of the plurality of indoor units may include setting the energy consumption amount of each of the plurality of indoor units by distributing the reference energy based on a consumption energy of each of the plurality of indoor units respectively connected with the plurality of outdoor units.

Each of the plurality of heat source devices may include at least one of a cooling tower, a boiler, an expansion tank, or a heat exchanger.

Each of an energy capacity of the plurality of indoor units and an energy capacity of the plurality of outdoor units may be smaller than an energy capacity of the plurality of heat source devices.

The setting of the energy consumption amount of each of the plurality of indoor units may include calculating a consumption energy of the plurality of heat source devices based on a compression energy of the plurality of outdoor units and heat absorption amounts of the plurality of indoor units.

The method for controlling the air conditioning control device, according to an embodiment, may further include controlling a display to display energy consumption amounts of the plurality of indoor units in correspondence to the plurality of indoor units.

In accordance with another aspect of the disclosure, an air conditioning system is provided. The air conditioning system includes a plurality of outdoor units, a plurality of indoor units connected with the plurality of outdoor units, a plurality of heat source devices connected with the plurality of outdoor units, and an air conditioning control device configured to determine a reference energy and a consumption energy of the plurality of heat source devices, distribute, in a case in which the consumption energy of the plurality of heat source devices exceeds the reference energy, an excess energy amount to the plurality of indoor units, and set an energy consumption amount of each of the plurality of indoor units based on the distributed excess energy amount, wherein each of the plurality of heat source devices is a water heat source type of heat source device.

An air conditioning system including a water heat source type heat source device, an air conditioning control device, and a method for controlling the same, according to an embodiment, may rationally distribute consumption energy of the heat source device to respective users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a flowchart according to an embodiment of the disclosure.

Throughout the drawings, it should be noted that like reference numbers are used to depict the same or similar elements, features, and structures.

DETAILED DESCRIPTION

Figure 1:
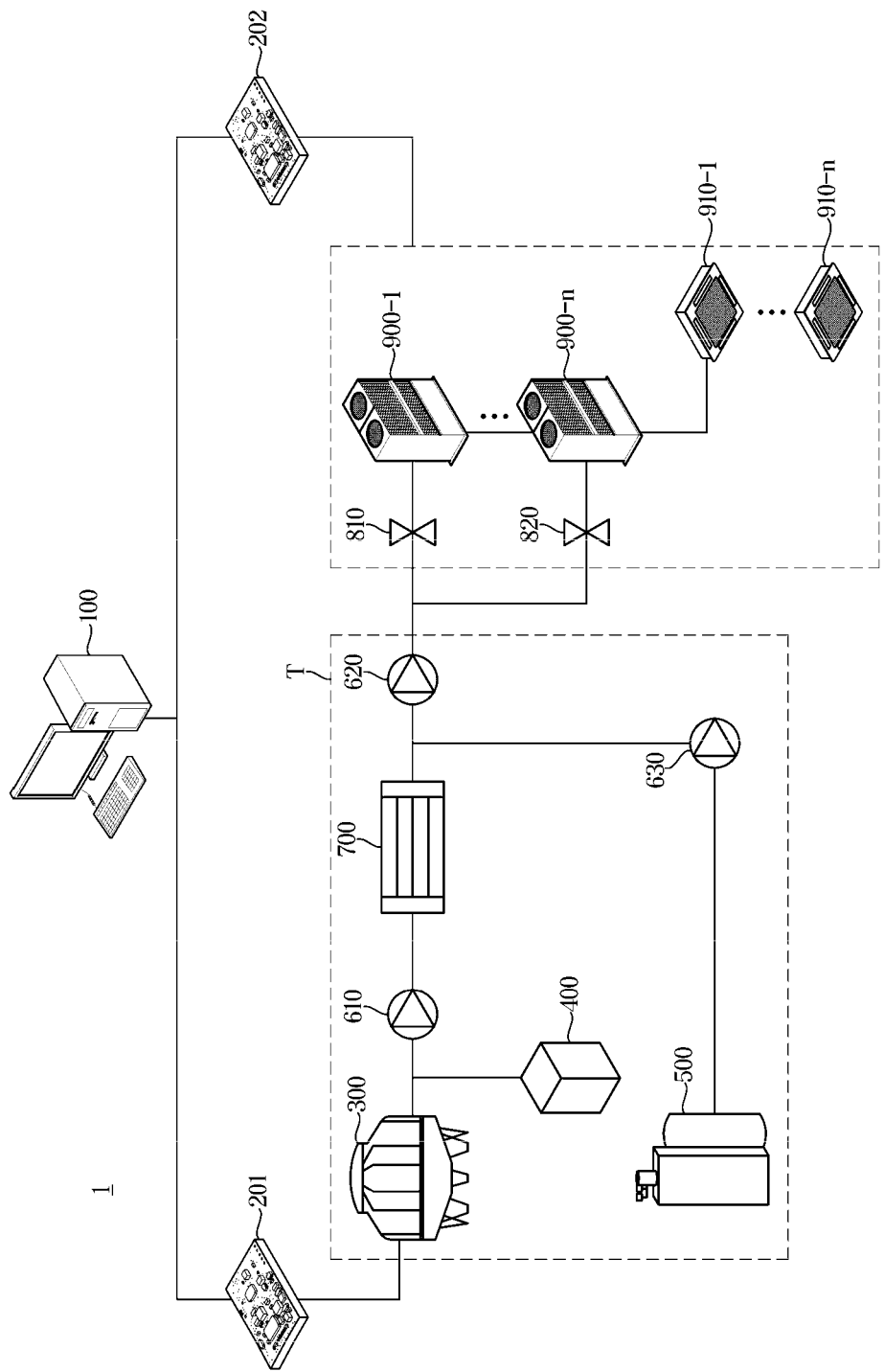
FIG. 1 shows a configuration of an air conditioning system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Like reference numerals will refer to like components throughout this specification. This specification does not describe all components of the embodiments, and general information in the technical field to which the disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

It will be understood that when a certain part is referred to as being "connected" to another part, it can be directly or indirectly connected to the other part. When a part is indirectly connected to another part, it may be connected to the other part through a wireless communication network.

Also, it will be understood that when the terms "includes," "comprises," "including," and/or "comprising," when used in this specification, specify the presence of a stated component, but do not preclude the presence or addition of one or more other components.

In the entire specification, it will also be understood that when an element is referred to as being "on" or "over" another element, it can be directly on the other element or intervening elements may also be present.

It will be understood that the terms "first", "second", etc., may be used only to distinguish one component from another, and these components should not be limited by these terms.

Reference numerals used in operations are provided for convenience of description, without describing the order of the operations, and the operations can be executed in a different order from the stated order unless a specific order is definitely specified in the context.

Hereinafter, an operation principle and embodiments of the disclosure will be described with reference to the accompanying drawings.

Figure 2:
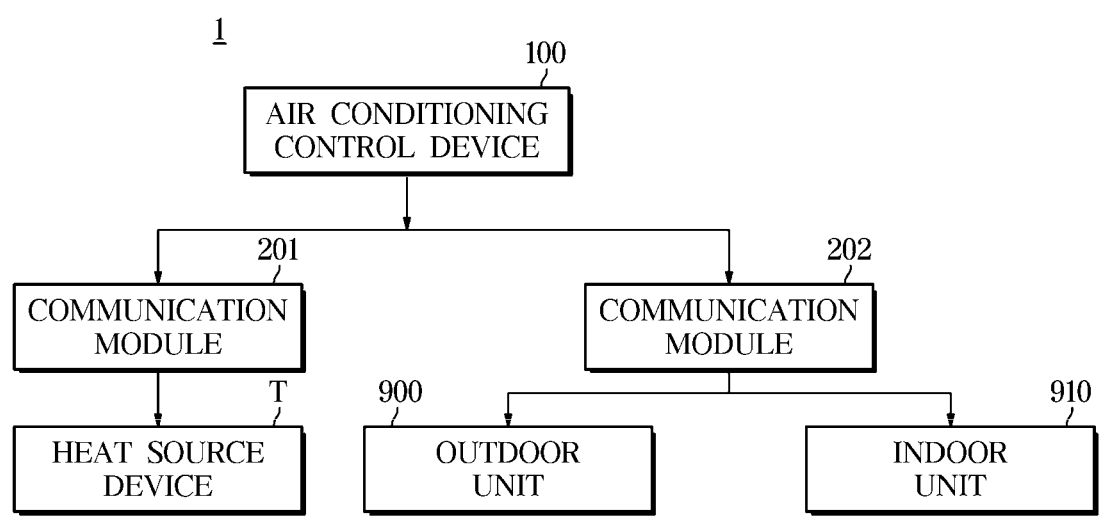
FIG. 2 is a control block diagram of an air conditioning system according to an embodiment of the disclosure.

FIG. 1 shows a configuration of an air conditioning system according to an embodiment of the disclosure, and FIG. 2 is a control block diagram of an air conditioning system according to an embodiment of the disclosure.

Referring to FIGS. 1 and 2, an air conditioning system 1 according to an embodiment may include an air conditioning control device 100, at least one outdoor unit 900 (e.g., outdoor units 900-1, . . . , 900-n), at least one indoor unit 910 (e.g., indoor units 910-1, . . . , 910-n), communication modules 201 and 202, a cooling tower 300, a boiler 500, an expansion tank 400, a heat exchanger 700, heat pumps 610, 620, and 630, and valves 810 and 820.

The cooling tower 300 may be equipment for cooling water used to condense a refrigerant flowing along a refrigerating cycle, such as an air conditioner or a refrigerator, by causing the cooling water to contact air.

The boiler 500 may be provided as an apparatus for heating water from the cooling tower.

The expansion tank 400 may absorb an expansion or contraction amount of water in a pipe upon expansion or contraction according to a change in temperature of the water to appropriately control inside pressure of the pipe.

The heat exchanger 700 may be provided as an apparatus for heat exchange with air.

The cooling tower 300, the boiler 500, the expansion tank 400, the heat exchanger 700, etc. may be referred to as heat source devices T.

The heat source devices T may be devices connected with the outdoor units to provide heat sources and control flows of heat.

The heat pumps 610, 620, and 630 may be provided as components for pumping water stored in the cooling tower to the indoor units and the outdoor units.

The valves 810 and 820 may be provided as components for adjusting an amount of flowing water at each opening position.

The communication modules 201 and 202 may be provided as components for enabling the air conditioning control device to communicate with the heat source devices, the outdoor units, and the indoor units.

The communication modules 201 and 202 may include one or more components for enabling communication, and include at least one of, for example, a short-range communication module, a wired communication module, or a wireless communication module.

The air conditioning system 1 may include a plurality of outdoor units 900-1, . . . , 900-n and a plurality of indoor units 910-1, . . . , 910-n.

The outdoor units 900-1, . . . , 900-n may be connected with the indoor units and provided as components including compressors to transfer heat.

The indoor units 910-1, . . . , 910-n may be provided as components including blow fans to control flows of heat in indoor spaces.

In a case in which consumption energy of the plurality of heat source devices exceeds reference energy, the air conditioning control device 100 may distribute an excess energy amount to the plurality of indoor units to set an energy consumption amount of each of the plurality of indoor units.

Energy mentioned in the disclosure may be a consumption amount of an object, such as a gas, power, and water, for circulating heat, and may be any kind that is convertible into a work.

The air conditioning control device 100 may set reference energy based on consumption energy of the plurality of outdoor units.

More specifically, the air conditioning control device 100 may set a preset proportion of consumption energy of the outdoor units to reference energy. The proportion to be set to the reference energy may be arbitrarily set by a user.

The air conditioning control device 100 may set an energy consumption amount of each indoor unit by distributing consumption energy of the heat source devices, exceeding the reference energy, based on an energy capacity of each of the plurality of indoor units.

An energy capacity mentioned in the specification may be a concept including a power rated capacity of each device.

An energy consumption amount of an indoor unit may be a sum of an energy consumption amount of the indoor unit, an energy consumption amount of an outdoor unit corresponding to the indoor unit, a consumption amount of the corresponding heat source device, and a consumption amount of a heat source device, exceeding reference energy.

Meanwhile, each of an energy capacity of the plurality of indoor units and an energy capacity of the plurality of outdoor units may be smaller than an energy capacity of the plurality of heat source devices.

The air conditioning control device 100 may be implemented with a memory (not shown) storing data for algorithms for controlling operations of components in the air conditioning system or for programs embodying the algorithms, and a processor (not shown) for performing the above-described operations by using the data stored in the memory. In this case, the memory and processor may be implemented as separate chips. Alternatively, the memory and processor may be implemented as a single chip. Details about operations of the air conditioning control device will be described with reference to FIG. 3.

At least one component may be added or omitted in correspondence to the performance of components of the air conditioning system shown in FIGS. 1 and 2. Also, it will be understood by one of ordinary skill in the art that the relative positions of the components may change in correspondence to the performance or structure of the system.

Figure 3:
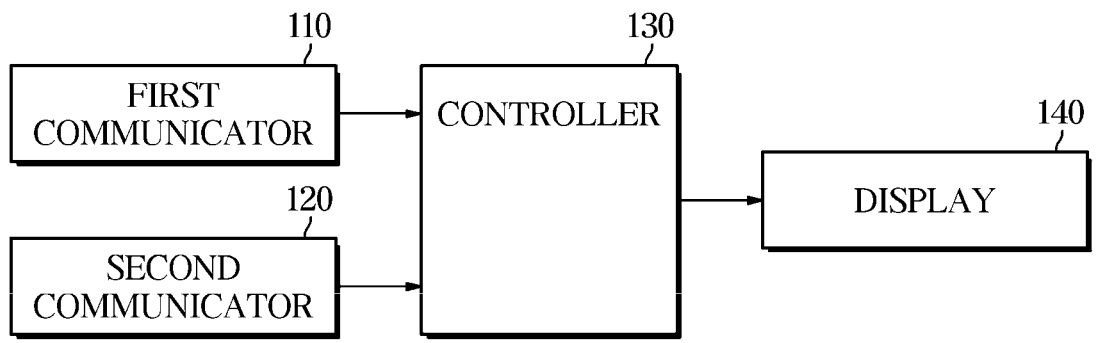
FIG. 3 is a control block diagram of an air conditioning control device according to an embodiment of the disclosure.

FIG. 3 is a control block diagram of an air conditioning control device according to an embodiment of the disclosure.

Referring to FIG. 3, the air conditioning control device may include a first communicator 110, a second communicator 120, a display 140, and a controller 130.

The first communicator 110 may communicate with a plurality of outdoor units and a plurality of indoor units connected with the plurality of outdoor units. The second communicator 120 may communicate with a plurality of water heat source type heat source devices connected with the plurality of outdoor units.

The first communicator 110 and the second communicator 120 may include one or more components for enabling communication with the heat source devices, the indoor units, and the outdoor units, and may include at least one of, for example, a short-range communication module, a wired communication module, or a wireless communication module.

The short-range communication module may include various short-range communication modules, such as a Bluetooth module, an Infrared communication module, a Radio Frequency Identification (RFID) communication module, a Wireless Local Access Network (WLAN) communication module, a Near Field Communication (NFC) module, a Zigbee communication module, etc., to transmit/receive signals through a wireless communication network at a short distance.

The wired communication module may include various cable communication modules, such as a Universal Serial Bus (USB), a High Definition Multimedia Interface (HDMI), a Digital Visual Interface (DVI), Recommended Standard-232 (RS-232), power line communication, or a Plain Old Telephone Service (POTS), as well as various wired communication modules, such as a Controller Area Network (CAN) communication module, a Local Area Network (LAN) module, a Wide Area Network (WAN) module, or a Value Added Network (VAN) module.

The wireless communication module may include wireless communication modules supporting various wireless communication methods, such as a global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), etc., as well as a Wireless Fidelity (Wi-Fi) module and a Wireless broadband module.

The controller 130 may set an energy consumption amount of each of the plurality of indoor units by distributing reference energy based on consumption energy of each of the plurality of outdoor units.

More specifically, the controller 130 may set an energy consumption amount of each indoor unit by distributing a portion exceeding reference energy to each indoor unit and also distributing energy corresponding to the reference energy to each indoor unit.

The controller 130 may set an energy consumption amount of each of the plurality of indoor units by distributing reference energy based on consumption energy of each of the plurality of indoor units respectively connected with the plurality of outdoor units.

The controller 130 may calculate consumption energy of the plurality of heat source devices based on compression energy of the plurality of outdoor units and heat absorption amounts of the plurality of indoor units. The related descriptions will be given below.

The controller 130 may control the display 140 to display energy consumption amounts of the plurality of indoor units in correspondence to the plurality of indoor units, respectively.

The display 140 may be provided as a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECO) panel, a Light Emitting Diode (LED) panel, or an Organic Light Emitting Diode (OLED) panel, although not limited thereto.

The controller 130 may be implemented with a memory (not shown) storing data for algorithms for controlling operations of components in the air conditioning system or for programs embodying the algorithms, and a processor (not shown) for performing the above-described operations by using the data stored in the memory. In this case, the memory and processor may be implemented as separate chips. Alternatively, the memory and processor may be implemented as a single chip.

At least one component may be added or omitted in correspondence to the performance of components of the air conditioning control device shown in FIG. 3. Also, it will be easily understood by one of ordinary skill in the art that the relative positions of the components may change in correspondence to the performance or structure of the system.

Meanwhile, the components shown in FIG. 3 may be software components and/or hardware components, such as a Field Programmable Gate Array (FPGA) and an Application Specific Integrated Circuit (ASIC).

Figure 4:
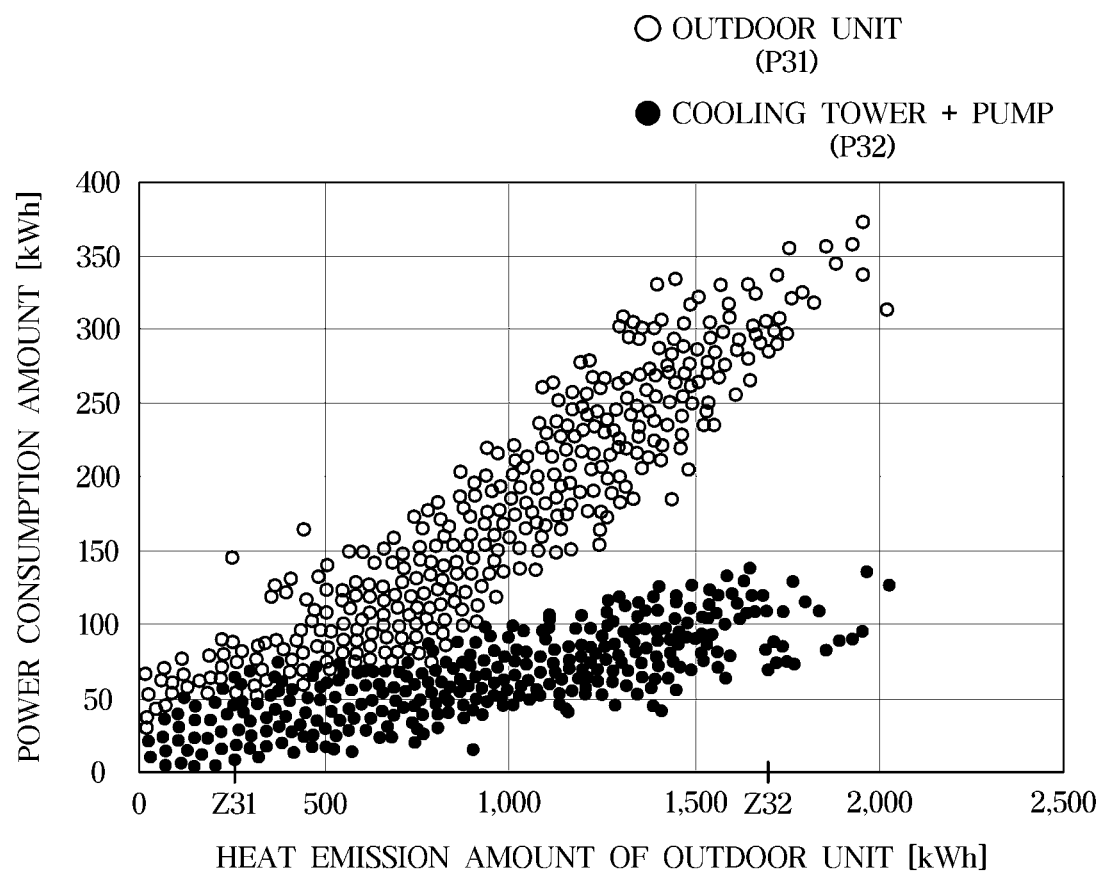
FIG. 4 is a graph showing consumption energy of an outdoor unit and a heat source device according to an embodiment of the disclosure.

FIG. 4 is a graph showing consumption energy P31 and P32 of an outdoor unit and a heat source device according to an embodiment of the disclosure.

In designing an air conditioning system, an energy capacity of a heat source device may be greater than those of an indoor unit and an outdoor unit.

According to an embodiment, an energy capacity of a heat source device versus an energy capacity of an outdoor unit or an indoor unit may be 1.3:1.

That is, an energy capacity of a heat source device may be designed to be greater than an energy capacity of an indoor unit or an outdoor unit, although there may be a difference according to device efficiency and situations.

Meanwhile, a user who uses an indoor unit having a relatively small capacity may use a heat source device designed to be suitable to a total capacity.

Referring to FIG. 4, more specifically, at a point Z31 where a heat emission amount of an outdoor unit is smaller than 500 kWh, although the indoor unit has a small capacity, an energy consumption amount of the corresponding heat source device may be set to be between 50 kWh and 100 kWh.

Upon simultaneous use of many users, an energy consumption amount of a heat source device may be about ⅓ of an energy consumption amount of an outdoor unit at a point Z32.

That is, at a point Z32, consumption energy of an outdoor unit or an indoor unit may be set to range from 300 kWh to 350 kWh, while consumption energy of a heat source device may be set to 100 kWh that makes no great difference from energy consumption at Z31.

That is, in a case in which a user uses a small consumption capacity, consumption energy of a heat source device may be greater than consumption energy of an outdoor unit.

Meanwhile, due to use of a large-capacity facility, an energy consumption amount may increase.

To avoid this, the disclosure may redistribute, to another user, consumption energy of a heat source device, which exceeds reference energy set to a preset proportion of consumption energy of an outdoor unit in distributed consumption energy, based on a ratio of energy capacities of indoor units. Details about this will be described below.

Figure 5:
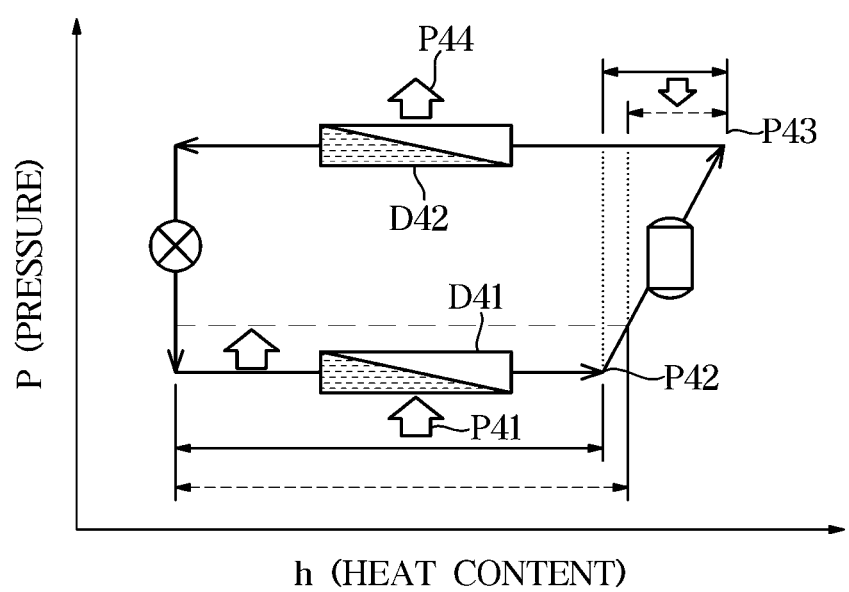
FIG. 5 is a graph for describing an operation of calculating consumption energy of a heat source device according to an embodiment of the disclosure.

FIG. 5 is a graph for describing an operation of calculating consumption energy of a heat source device according to an embodiment of the disclosure.

An air conditioning control device according to an embodiment may calculate consumption energy of a plurality of heat source devices based on compression energy of a plurality of outdoor units and heat absorption amounts of a plurality of indoor units.

More specifically, referring to FIG. 5, a heat source device including a cooling tower, a heat pump, a boiler, and an expansion tank may be a device for emitting heat of an outdoor unit to outside, and an energy consumption amount of the device may depend on a heat emission amount of the outdoor unit.

More specifically, in FIG. 5, P41 may be a heat absorption amount of an indoor unit D41. Also, P44 may be a heat emission amount of an outdoor unit D42. Meanwhile, the heat emission amount P44 of the outdoor unit may be a sum of the heat absorption amount P42 of the outdoor unit and compression energy P43 of the outdoor unit.

Meanwhile, the air conditioning control device may set an energy consumption amount of each indoor unit by distributing an energy consumption amount of heat source devices based on consumption energy of indoor units and outdoor units.

Meanwhile, the operation described with reference to FIG. 5 may be only an embodiment for calculating consumption energy of a heat source device based on a heat emission amount of an outdoor unit, and an operation for calculating consumption energy of a heat source device is not limited.

Figure 6:
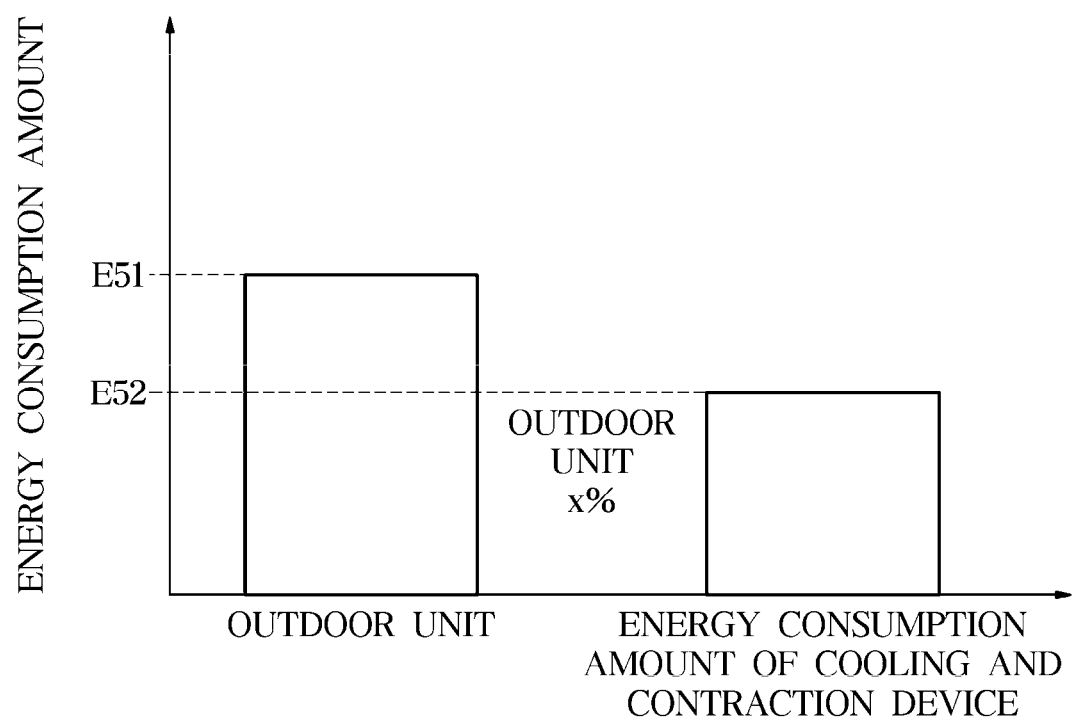
FIG. 6 is a view for describing an operation in a case in which consumption energy of a heat source device does not exceed reference energy according to an embodiment of the disclosure.
Figure 7:
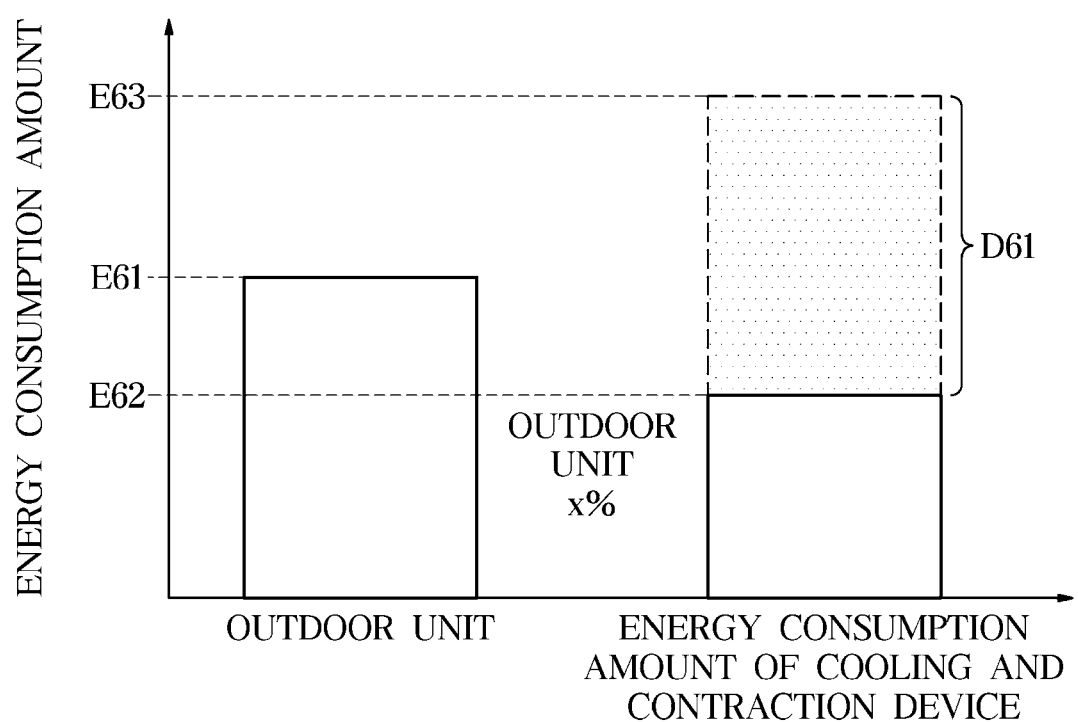
FIG. 7 is a view for describing an operation in a case in which consumption energy of a heat source device exceeds reference energy according to an embodiment of the disclosure.

FIG. 6 is a view for describing an operation in a case in which consumption energy of a heat source device does not exceed reference energy according to an embodiment of the disclosure, and FIG. 7 is a view for describing an operation in a case in which consumption energy of a heat source device exceeds reference energy according to an embodiment of the disclosure.

FIG. 6 shows consumption energy of an outdoor unit (E51). The air conditioning control device may set reference energy E52 by multiplying the consumption energy of the outdoor unit by a preset proportion.

FIG. 6 corresponds to a case in which many users use indoor units. This case may be a case in which each user efficiently uses energy of a heat source device and there may be no energy consuming reference energy.

That is, in a case in which there is no consumption energy of a heat source device, exceeding the reference energy, an energy consumption amount of each of a plurality of indoor units may be set by distributing only energy corresponding to the reference energy based on consumption energy of each outdoor unit.

That is, in this case, the air conditioning control device may distribute no consumption energy corresponding to an excess portion of the reference energy to other indoor units.

Referring to FIG. 7, the air conditioning control device may distribute, in a case in which consumption energy E63 of a plurality of heat source devices exceeds the reference energy, an excess energy amount to a plurality of indoor units to set an energy consumption amount of each of the plurality of indoor units.

More specifically, the air conditioning control device may set an energy consumption amount of each indoor unit by distributing excess consumption energy D61 of the heat source devices based on an energy capacity of each of the plurality of indoor units.

More specifically, the air conditioning control device may set reference energy E62 based on consumption energy E61 of an outdoor unit.

Meanwhile, the air conditioning control device may obtain consumption energy of the heat source devices based on the above-described operation.

More specifically, the air conditioning control device may compare consumption energy of an outdoor unit, distributed based on a consumption amount of an indoor unit, with consumption energy of a heat source device, and redistribute, in a case in which the consumption energy of the heat source device exceeds a preset proportion of the consumption energy of the outdoor unit, that is, reference energy, an excess energy amount based on an energy capacity proportion of an indoor unit for each user.

Meanwhile, the preset proportion for setting the reference energy may be arbitrarily set by a user.

Meanwhile, the air conditioning control device may distribute the excess energy to the indoor unit based on Equation below.

$$E = P \times \frac{C_t}{C_{tot}} \quad \text{Equation 1}$$

Referring to Equation 1, E may represent an energy consumption amount distributed to the corresponding indoor unit, and P may represent consumption energy of the heat source device excessing the reference energy. Also, $C_t$ may represent an energy amount of the corresponding indoor unit, and $C_{tot}$ may represent a sum of energy capacities of indoor units included in an air conditioning system.

The air conditioning control device may distribute excess consumption energy of heat source devices to each indoor unit by using the above-mentioned Equation.

Figure 8:
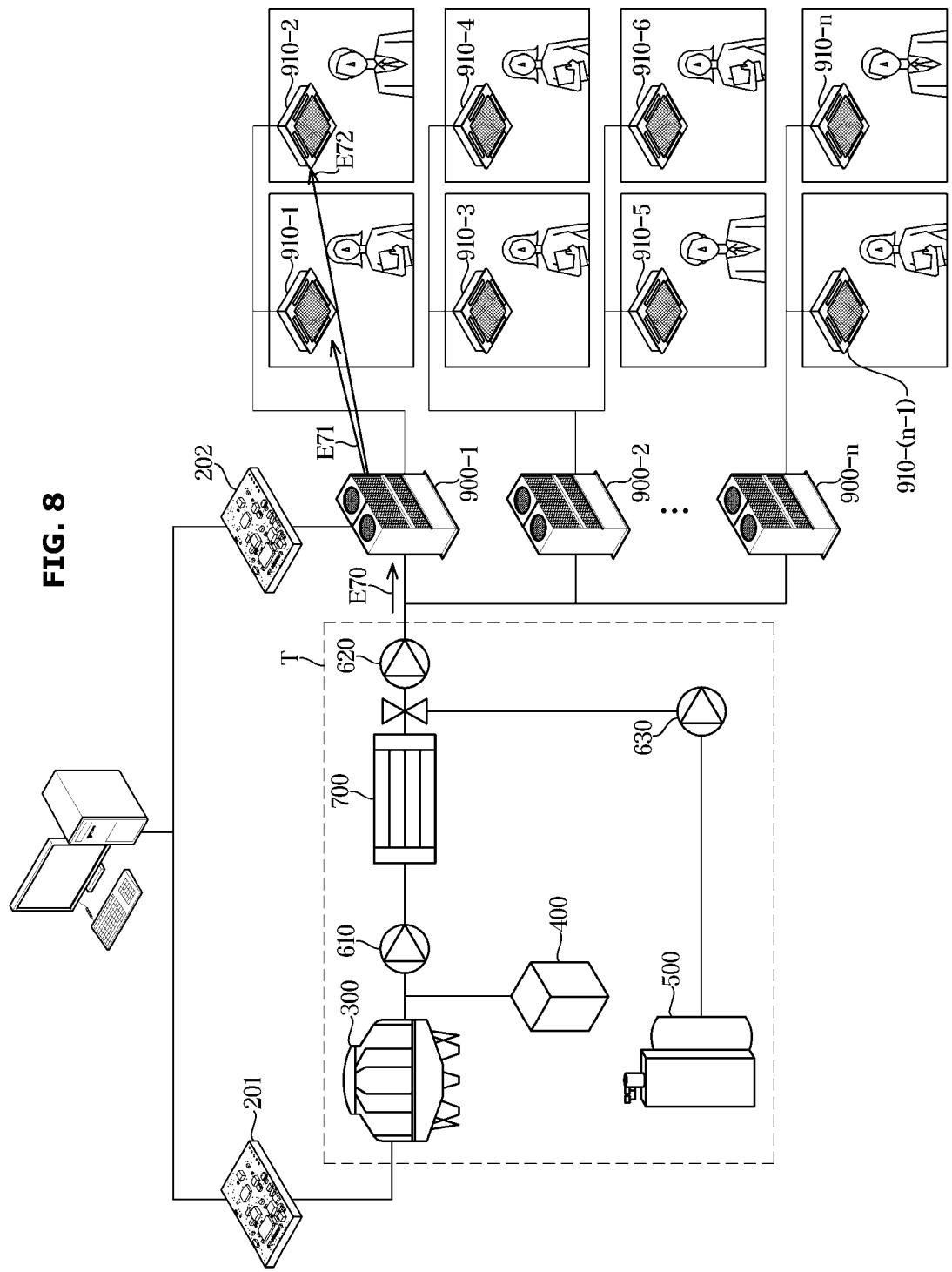
FIG. 8 is a view for describing an operation of setting an energy consumption amount of each indoor unit based on consumption energy of indoor units and outdoor units, according to an embodiment of the disclosure.

FIG. 8 is a view for describing an operation of setting an energy consumption amount of each indoor unit based on consumption energy of indoor units 910-1, . . . , 910-n and outdoor units 900-1, . . . , 900-n, according to an embodiment of the disclosure.

FIG. 8 is a view for describing an operation of distributing reference energy in a case in which consumption energy of a heat source device T does not exceed the reference energy.

The air conditioning control device 100 may set an energy consumption amount of each of the plurality of indoor units 910-1, . . . , 910-n by distributing consumption energy of a heat source device based on consumption energy of each of the plurality of outdoor units 900-1, . . . , 900-n.

More specifically, the air conditioning control device 100 may first distribute consumption energy of the heat source device T according to consumption energy of the outdoor units 900-1, . . . , 900-n (E70).

The distributing operation may be performed based on Equation 2 below.

$$E_o = P1 \times \frac{U_l}{U_{tot}} \qquad \text{Equation 2}$$

Referring to Equation 2, $E_o$ may represent consumption energy of the heat source device T, distributed to the corresponding outdoor unit, P1 may represent total consumption energy of the heat source device, $U_1$ may represent consumption energy of the corresponding outdoor unit, and $U_{tot}$ may represent total consumption energy of the outdoor unit.

That is, the air conditioning control device 100 may distribute consumption energy of the heat source device to the outdoor units 900-1, . . . , 900-n and Equation 2 may be used for such distribution.

Meanwhile, electricity, a gas, a steam, or water may be used as consumption energy, and each energy source may be distributed to each outdoor unit based on Equation 2.

Meanwhile, the air conditioning control device 100 may set an energy consumption amount of each of the plurality of indoor units 910-1, . . . , 910-n through a distribution based on consumption energy of each of the plurality of indoor units 910-1, . . . , 910-n respectively connected with the plurality of outdoor units 900-1, . . . , 900-n.

More specifically, an energy consumption amount of a heat source device, distributed to each of the outdoor units 900-1, . . . , 900-n, may be distributed to each indoor unit according to proportions of consumption amounts of the indoor units 910-1, . . . , 910-n.

The air conditioning control device 100 may perform the operation based on Equation 3 below.

$$E_i = E_o \times \frac{M_l}{M_{tot}} \qquad \text{Equation 3}$$

Referring to Equation 3, $E_i$ may represent consumption energy of the heat source device, distributed to the corresponding indoor unit, $E_o$ may represent consumption energy of the heat source device, distributed to the corresponding outdoor unit, $M_1$ may represent consumption energy of the corresponding indoor unit, and $M_{tot}$ may represent total consumption energy of indoor units connected with the corresponding outdoor unit. The air conditioning control device may distribute consumption energy to each indoor unit based on Equation 3.

That is, the air conditioning control device may distribute E71 and E72 of consumption energy E70 of a heat source device, distributed to the corresponding outdoor unit 900-1, to the corresponding indoor units 910-1 and 910-2, respectively.

Meanwhile, a consumption amount of an indoor unit may be a sum of a processing heat quantity of the indoor unit, standby energy of the indoor unit, and fan energy of the indoor unit. Meanwhile, the processing heat quantity of the indoor unit may be set by a temperature difference between indoor setting temperature and actual temperature and a rated capacity of the indoor unit. In summary, the air conditioning control device may distribute consumption energy used by a heat source device to each outdoor unit and each indoor unit based on the operation described with reference to FIG. 8.

Figure 9:
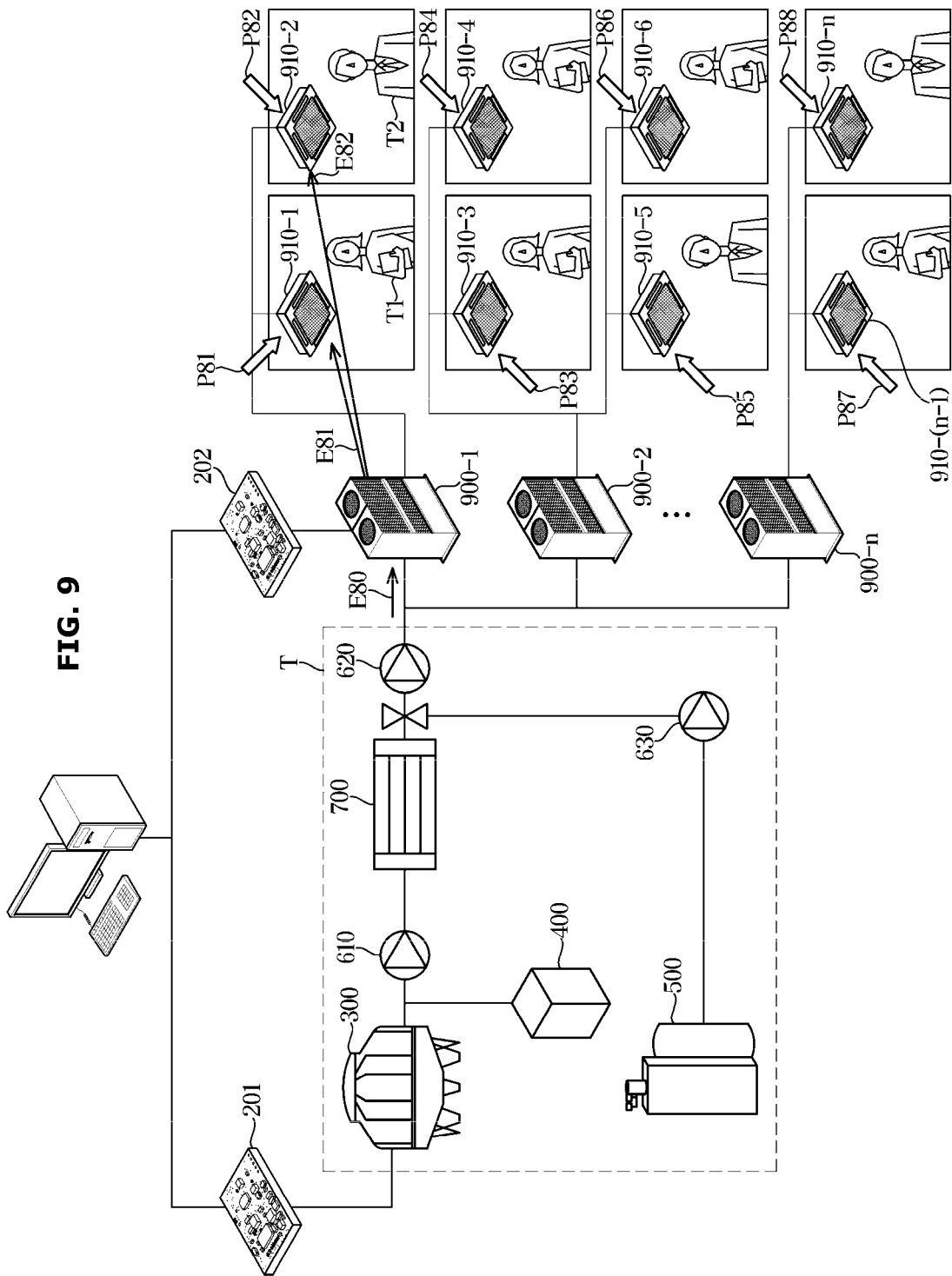
FIG. 9 is a view for describing an operation of distributing consumption energy of a heat source device, exceeding reference energy, to respective indoor units, according to an embodiment of the disclosure.

FIG. 9 is a view for describing an operation of distributing consumption energy of a heat source device, exceeding reference energy, to indoor units, according to an embodiment of the disclosure.

FIG. 9 shows a case in which two users T1 and T2 of all users operate indoor units. In this case, because an outdoor unit 900-1 (E80) mainly operates, an amount of reference energy set based on consumption energy of the outdoor unit 900-1 may be relatively small. Accordingly, consumption energy consumed by a heat source device T may exceed the reference energy.

Meanwhile, the entire reference energy may be distributed to the outdoor unit 900-1, because a single outdoor unit operates, and energy may be distributed to the users T1 and T2 connected with the corresponding outdoor unit.

However, the reference energy may be set based on consumption energy of the outdoor unit 900-1, and the air conditioning control device 100 may distribute consumption energy of the heat source device, exceeding the reference energy, to each user (P81 to P87). Upon the distribution of the consumption energy of the heat source device, exceeding the reference energy, an energy capacity of each indoor unit may be used.

Figure 10:
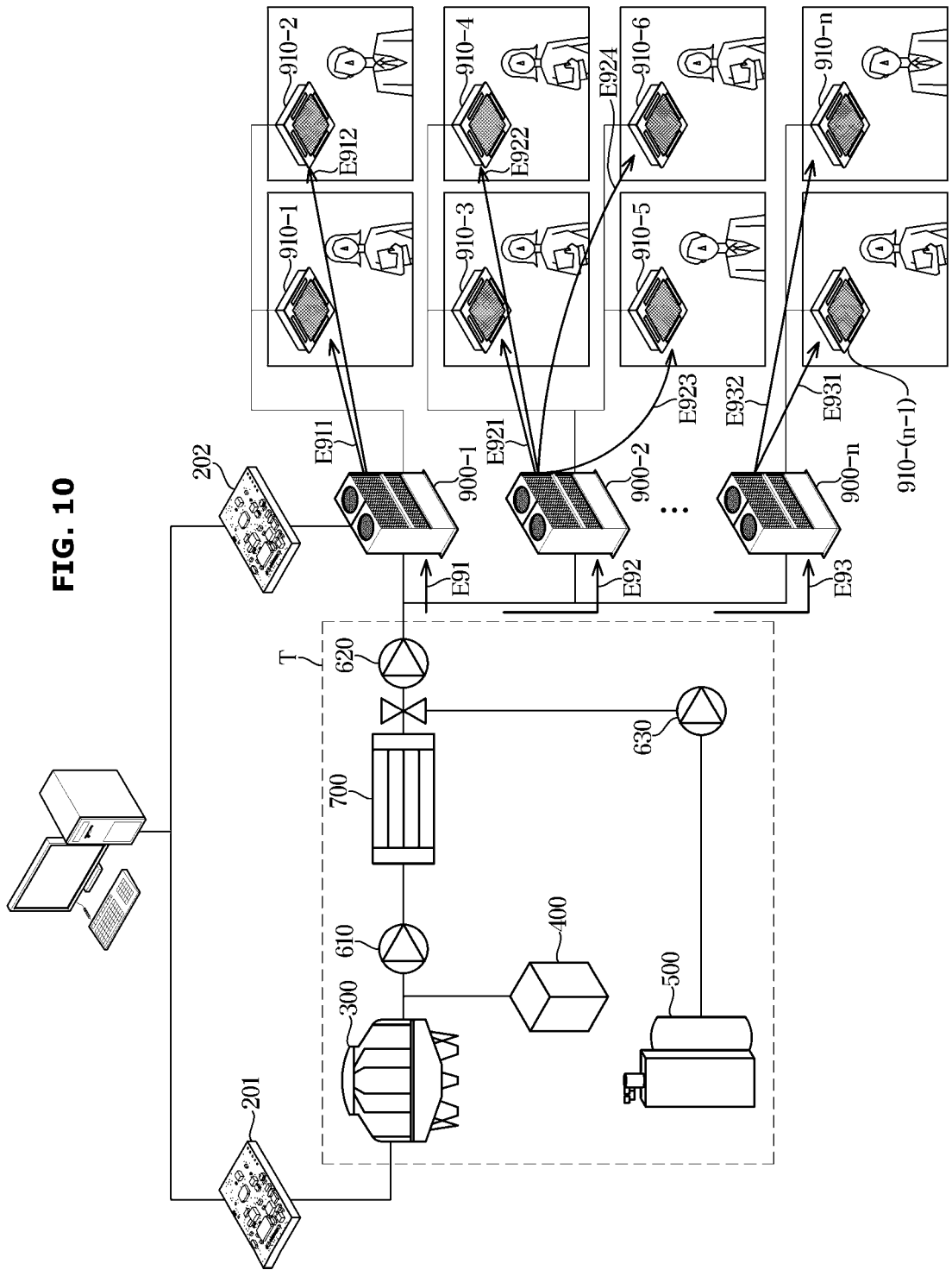
FIG. 10 shows a case in which consumption energy of a heat source device does not exceed reference energy according to an embodiment of the disclosure.

FIG. 10 shows a case in which all users use indoor units, unlike FIG. 9, according to an embodiment of the disclosure. In this case, all outdoor units may operate, and reference energy may be set based on consumption energy of each outdoor unit. In this case, the reference energy may be set to significantly great energy, unlike FIG. 9.

Accordingly, consumption energy of heat source devices T may not exceed the reference energy. Accordingly, the air conditioning control device may set an energy consumption amount of each indoor unit by distributing energy of the heat source devices.

That is, the air conditioning control device may distribute consumption energy of the heat source devices T according to consumption energy of each indoor unit (E91, E92, and E93). Also, consumption energy of the heat source devices, which is distributed to each outdoor unit, may be distributed according to consumption energy of each indoor unit (E911 to E932).

Referring to FIG. 10, because consumption energy of the heat source devices does not exceed the reference energy, no energy exceeding the reference energy may be distributed, unlike FIG. 9.

Meanwhile, operations described with reference to FIGS. 9 and 10 are an embodiment, and a distribution of consumption energy according to a user's consumption may be performed in various ways.

FIG. 11 is a flowchart according to an embodiment of the disclosure.

Referring to FIG. 11, the air conditioning control device may calculate reference energy of a heat source device based on an energy consumption amount of the heat source device and energy consumption amounts of an outdoor unit and an indoor unit at operation 1001.

Also, the air conditioning control device may distribute consumption energy of the heat source device to the outdoor unit and the indoor unit at operation 1002. Meanwhile, upon the distribution of the consumption energy of the heat source device, the energy consumption amounts of the outdoor unit and indoor unit may be considered at operation 1003.

In a case in which the consumption energy of the heat source device exceeds the reference energy, excess consumption energy may be redistributed based on an energy capacity of the indoor unit at operation 1004.

However, in a case in which the consumption energy of the heat source device does not exceed the reference energy, the corresponding consumption energy may be distributed based on consumption energy of the outdoor unit and indoor unit.

The air conditioning control device may set an energy consumption amount for each indoor unit based on the operation, and output the energy consumption amount for each indoor unit on a display at operation 1005.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a non-transitory computer-readable recording medium.

The non-transitory computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, a flash memory, an optical data storage device, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An air conditioning control device comprising:
   a first communicator configured to communicate with a plurality of outdoor units and a plurality of indoor units connected with the plurality of outdoor units;
   a second communicator configured to communicate with a plurality of heat source devices connected with the plurality of outdoor units; and
   a controller configured to:
      determine a reference energy and a consumption energy of the plurality of heat source devices,
      distribute, in a case in which the consumption energy of the plurality of heat source devices exceeds the reference energy, an excess energy amount to the plurality of indoor units, and
      set an energy consumption amount of each of the plurality of indoor units based on the distributed excess energy amount,
   wherein each of the plurality of heat source devices is a water heat source type of heat source device.

2. The air conditioning control device of claim 1, wherein the controller is further configured to set the reference energy based on a consumption energy of the plurality of outdoor units.

3. The air conditioning control device of claim 1, wherein the controller is further configured to set the energy consumption amount of each of the indoor units by distributing excess consumption energy of the plurality of heat source devices based on energy capacities of the plurality of indoor units.

4. The air conditioning control device of claim 1, wherein the controller is further configured to set the energy consumption amount of each of the plurality of indoor units by distributing the reference energy based on a consumption energy of each of the plurality of outdoor units.

5. The air conditioning control device of claim 4, wherein the controller is further configured to set the energy consumption amount of each of the plurality of indoor units by distributing the reference energy based on the consumption energy of each of the plurality of indoor units respectively connected with the plurality of outdoor units.

6. The air conditioning control device of claim 1, wherein the controller is further configured to calculate the consumption energy of the plurality of heat source devices based on a compression energy of the plurality of outdoor units and heat absorption amounts of the plurality of indoor units.

7. The air conditioning control device of claim 1, further comprising:
   a display,
   wherein the controller is further configured to control the display to display energy consumption amounts of the plurality of indoor units in correspondence to the plurality of indoor units.

8. A method performed by an air conditioning control device, the method comprising:
   determining a reference energy and a consumption energy of a plurality of heat source devices connected with a plurality of outdoor units;
   distributing, in a case in which the consumption energy of the plurality of heat source devices exceeds the reference energy, an excess energy amount to a plurality of indoor units connected with the plurality of outdoor units; and
   setting an energy consumption amount of each of the plurality of indoor units based on the distributed excess energy amount,
   wherein each the plurality of heat source devices is a water heat source type of heat source device.

9. The method of claim 8, wherein the setting of the reference energy comprises setting the reference energy based on the consumption energy of the plurality of outdoor units.

10. The method of claim 8, wherein the setting of the energy consumption amount of each of the plurality of indoor units comprises setting the energy consumption amount of each of the plurality of indoor units by distributing excess consumption energy of the heat source devices based on an energy capacity of each of the plurality of indoor units.

11. The method of claim 8, wherein the setting of the energy consumption amount of each of the plurality of indoor units comprises setting the energy consumption amount of each of the plurality of indoor units by distributing the reference energy based on a consumption energy of each of the plurality of outdoor units.

12. The method of claim 11, wherein the setting of the energy consumption amount of each of the plurality of indoor units comprises setting the energy consumption amount of each of the plurality of indoor units by distributing the reference energy based on a consumption energy of each of the plurality of indoor units respectively connected with the plurality of outdoor units.

13. The method of claim 8, wherein each of the plurality of heat source devices include at least one of a cooling tower, a boiler, an expansion tank, or a heat exchanger.

14. The method of claim 8, wherein each of an energy capacity of the plurality of indoor units and an energy capacity of the plurality of outdoor units is smaller than an energy capacity of the plurality of heat source devices.

15. The method of claim 8, wherein the setting of the energy consumption amount of each of the plurality of indoor units comprises calculating a consumption energy of the plurality of heat source devices based on a compression energy of the plurality of outdoor units and heat absorption amounts of the plurality of indoor units.

16. The method of claim 8, further comprising:
controlling a display to display energy consumption amounts of the plurality of indoor units in correspondence to the plurality of indoor units.

* * * * *